(12) United States Patent
Haripko

(10) Patent No.: US 11,468,422 B2
(45) Date of Patent: Oct. 11, 2022

(54) SYSTEMS AND METHODS FOR DETERMINING A PROVIDER-SPECIFIC LIKELIHOOD OF PAYMENT ACCEPTANCE

(71) Applicant: Mitchell International, Inc., San Diego, CA (US)

(72) Inventor: Lee Haripko, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 0 days.

(21) Appl. No.: 16/997,849

(22) Filed: Aug. 19, 2020

(65) Prior Publication Data
US 2021/0056531 A1    Feb. 25, 2021

Related U.S. Application Data

(60) Provisional application No. 62/889,262, filed on Aug. 20, 2019.

(51) Int. Cl.
*G06Q 20/24*    (2012.01)
*G06Q 20/38*    (2012.01)
*G06Q 20/10*    (2012.01)

(52) U.S. Cl.
CPC .......... *G06Q 20/24* (2013.01); *G06Q 20/102* (2013.01); *G06Q 20/382* (2013.01)

(58) Field of Classification Search
USPC .................................................. 705/35, 40
See application file for complete search history.

(56) References Cited

U.S. PATENT DOCUMENTS

| | | | | |
|---|---|---|---|---|
| 7,689,468 B2* | 3/2010 | Walker | ............... | G06Q 20/04 |
| | | | | 705/26.4 |
| 8,666,840 B1* | 3/2014 | Matsas | ............... | G06Q 30/06 |
| | | | | 705/26.1 |
| 2008/0294543 A1* | 11/2008 | Shebby | ............... | G06Q 50/16 |
| | | | | 705/37 |
| 2014/0180803 A1* | 6/2014 | Sedighian | .......... | G06Q 30/0253 |
| | | | | 705/14.51 |
| 2015/0317709 A1* | 11/2015 | Zimmerman | .......... | G06Q 30/08 |
| | | | | 705/80 |

* cited by examiner

*Primary Examiner* — William E Rankins

(57) ABSTRACT

Embodiments of the application are directed toward a method comprising: receiving, by a transaction management computing apparatus, an electronic payment estimate via a secure communication channel for services rendered by a provider; receiving determining a likelihood of payment acceptance by generating, by the transaction management computing apparatus, an payment amount acceptable to the provider computing device based on data associated with the provider computing device, a type of service provided, or a number of days to make the payment; determining, by the transaction management computing apparatus, whether the generated exact amount is acceptable to the provider computing device; and completing, by the transaction management computing apparatus, a payment transaction with the generated exact amount when the generated exact amount is determined to be acceptable to the provider computing device.

12 Claims, 8 Drawing Sheets

Dear Provider,

You have an outstanding bill through Zurich Insurance for a Workers' Compensation Bill for Claimant John Smith.

Bill Details:
Date of Service XX/XX/XXXX
Claimant Name: John Smith
Total Billed Charges: $494

Prompt Pay Offer= $406 paid in X Days

Accept    Decline

Dr. Haripko,

Thank you for another successful outcome. Please sign below to confirm.

Confirm you name, *** and signature

Full Name: John Clark

Initials: JC

Signature Style

705

Signed by: *[signature]*

* ***

☐ Should you wish to enroll in our network and avoid future emails, click here

FIG. 7

SYSTEMS AND METHODS FOR DETERMINING A PROVIDER-SPECIFIC LIKELIHOOD OF PAYMENT ACCEPTANCE

RELATED APPLICATIONS

This application claims the benefit of U.S. Provisional Application No. 62/889,262 filed on Aug. 20, 2019, the contents of which are incorporated herein by reference in its entirety.

TECHNICAL FIELD

The present disclosure is generally related to systems and methods for determining a provider-specific likelihood of payment acceptance, and more particularly, some embodiments relate to a systems and methods for implementing the same.

BACKGROUND

Payment negotiations over an outstanding bill for services may take place between a provider of services and a party bearing financial responsibility for the services rendered. For example, a hospital may treat a claimant injured in an accident insured under workers compensation insurance. After the services have been provide, the provider then bills a payor (i.e., the party bearing financial responsibility for the claimant) and awaits payment. Rather than paying the provider, the payor may use a negotiator to negotiate with the provider and determine if a more optimal agreement can be made to settle the bill and determine future payments. The process typically targets those providers that are not in a PPO at the time of that billing. Providers are typically interested in payment certainty and/or payment expediency. During a typical negotiation, a negotiator would communicate with the provider or their designated representative via standard communication means (e.g., phone call, email) and attempt to negotiate with the provider on a lower than billed amount and timeline for the provider to be paid. Currently existing tools rely on individual negotiator skills to determine the payment amount that will likely be accepted by the provider and result in lower payment.

SUMMARY

In accordance with one or more embodiments, various features and functionality can be provided for determining a provider-specific likelihood of payment acceptance.

Embodiments of the application are directed toward a method comprising: receiving, by a transaction management computing apparatus, an electronic payment estimate via a secure communication channel for services rendered by a provider; receiving determining a likelihood of payment acceptance by generating, by the transaction management computing apparatus, an payment amount acceptable to the provider computing device based on data associated with the provider computing device, a type of service provided, or a number of days to make the payment; determining, by the transaction management computing apparatus, whether the generated exact amount is acceptable to the provider computing device; and completing, by the transaction management computing apparatus, a payment transaction with the generated exact amount when the generated exact amount is determined to be acceptable to the provider computing device.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

FIGS. 4-7 illustrate an example graphical user interface of acceptance tool, according to an implementation of the disclosure.

DETAILED DESCRIPTION

Figure 1:
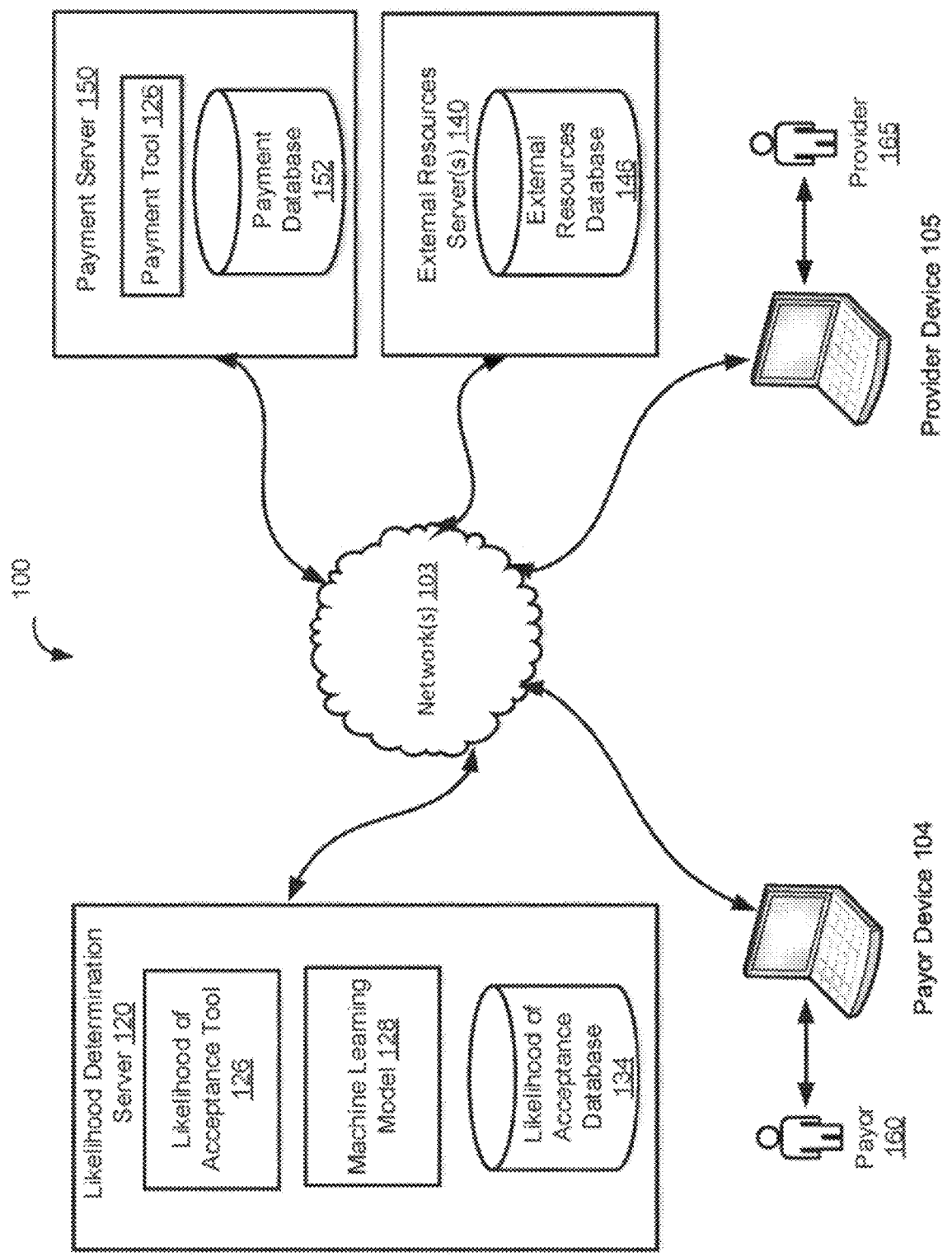
FIG. 1 illustrates an example system for determining a provider-specific likelihood of payment acceptance, according to an implementation of the disclosure.

Described herein are systems and methods for determining a provider-specific likelihood of payment acceptance. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As alluded to above, payors, such as insurance entities, are interested in negotiating with a service provider to lower the payment amount for services rendered by the provider to the clamant. Payors often engage third-party negotiators to lower the payment amount on their behalf. Negotiators may use existing technological tools which allows them to engage the provider and secure an agreement for lowered payment amount. Because the payment amounts are determined by individual negotiators, currently available methods are inefficient and time consuming and ineffective in securing the lowest payment the provider may pay.

Embodiments of the disclosed technology provide a tool for determining a provider-specific likelihood of payment acceptance. For example, the likelihood of acceptance of payment related to services rendered by a service provider (e.g., a medical hospital). The payment may be submitted by a payor, which may be a party with financial responsibility to pay the for the services (e.g., an insurance company).

In some embodiments, the likelihood of payment acceptance for a particular provider may be determined by analyzing provider information, historical payment information, payor information, and contextual information. For example, provider information may include provider type a type of service rendered, date and time of when the service was rendered, number of days within which a payment has to be made, and other such information. For example, a smaller provider office that has cash constraints may be more willing to take a lower amount in favor of being paid more quickly. Likewise, a hospital that deems the uncertainty of payment to be high or may not be able to easily identify the payor/insurer may be more willing to accept a lower dollar amount in favor of certainty of payment (leading to less bad debt write-offs). Further, historical information may include information related to previously accepted payments by the provider and/or ranges of accepted payment, and other such information. Payor information may include the type of payor, including past occurrences of payment settlement. Contextual information may include information related to current financial data and other such information related to events that may affect provider's decision. Contextual information may be obtained from various sources, as further described in detail herein.

Accordingly, an advantage of the present system which is a determination likelihood of payment acceptance based on historical data related to a specific provider as well as other similarly situated providers. The determination of the likelihood of payment acceptance provides several advantages. For example, using the likelihood of payment acceptance determination may be used to generate an offer to the service provider. By virtue of transmitting the offer that includes the payment amount generated based on the likelihood of acceptance increases the likelihood of actual acceptance of the payment by the service provider. That is, a particular provider is more likely to accept the payment that has been determined to have a higher likelihood of acceptance. As a result, it reduces the number of transmissions between the payor and the provider that would have had to be generated during a conventional settlement negotiation process. For example, if the payor transmits an offer comprising a payment amount that is not acceptable to the provider (a low offer) it is likely will be rejected by the provider and thus necessitate a number of subsequent transmissions between the payor and the provider. Even further, without using a provider-specific likelihood of payment acceptance of payment when transmitting an offer may stall or impede the settlement process altogether. By contrast, an offer to settle an outstanding bill comprising a payment amount with a high likelihood of acceptance may result in reduced number of transmissions between the parties.

System

FIG. 1 illustrates a provider-specific likelihood of payment acceptance determination system 100 according to some embodiments of the disclosed technology. In some embodiments, system 100 may include a likelihood determination server 120, a payment server 150, a one or more external resources server(s) 140, a network 103, a first user computing device (e.g., a payor computing device 104) associated with a first user (e.g., a payor 160), and a second user computing device (e.g., a provider computing device 105) associated with a second user (e.g., a provider 165). Additionally, system 100 may include other network devices such as one or more routers and/or switches.

In some embodiments, each of payor computing device 104 and/or provider device 105 may include a variety of electronic computing devices, for example, a smartphone, a tablet, a laptop, a display, a mobile phone, a computer wearable device, such as smart glasses, or any other head mounted display device, or a combination of any two or more of these data processing devices, and/or other devices.

Likelihood Determination and Payment Servers

In some embodiments, likelihood determination server 120 and payment server 150 may each include a processor, a memory, and network communication capabilities. In some embodiments, likelihood determination server 120 and payment server 150 may each be a hardware server. In some implementations, likelihood determination server 120 and payment server 150 may each be provided in a virtualized environment, e.g., likelihood determination server 120 and/or payment server 150 may be a virtual machine that is executed on a hardware server that may include one or more other virtual machines. Additionally, in one or more embodiments of this technology, virtual machine(s) running on likelihood determination server 120 and/or payment server 150 may be managed or supervised by a hypervisor. Likelihood determination server 120 and payment server 150 may be communicatively coupled to network 103.

In some embodiments, the memory of likelihood determination server 120 may include likelihood of acceptance database 134. The likelihood of acceptance database 134 may include one or more database, which may store association data related to determining the likelihood payment (e.g., provider information, historical payment information, payor information, and/or contextual information, as alluded to above).

Figure 2:
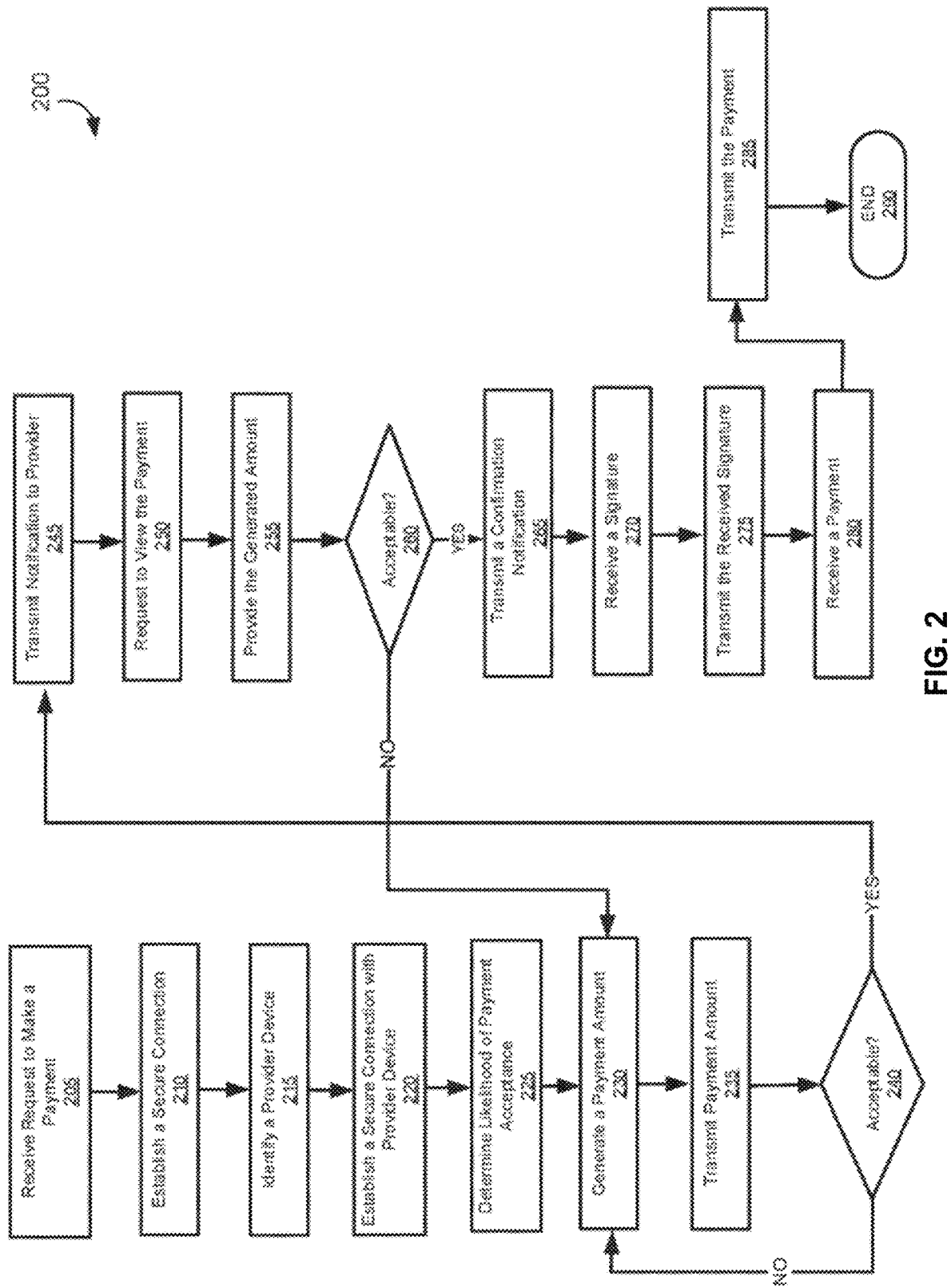
FIG. 2 illustrates an example process for determining a provider-specific likelihood of payment acceptance, according to an implementation of the disclosure.
Figure 3:
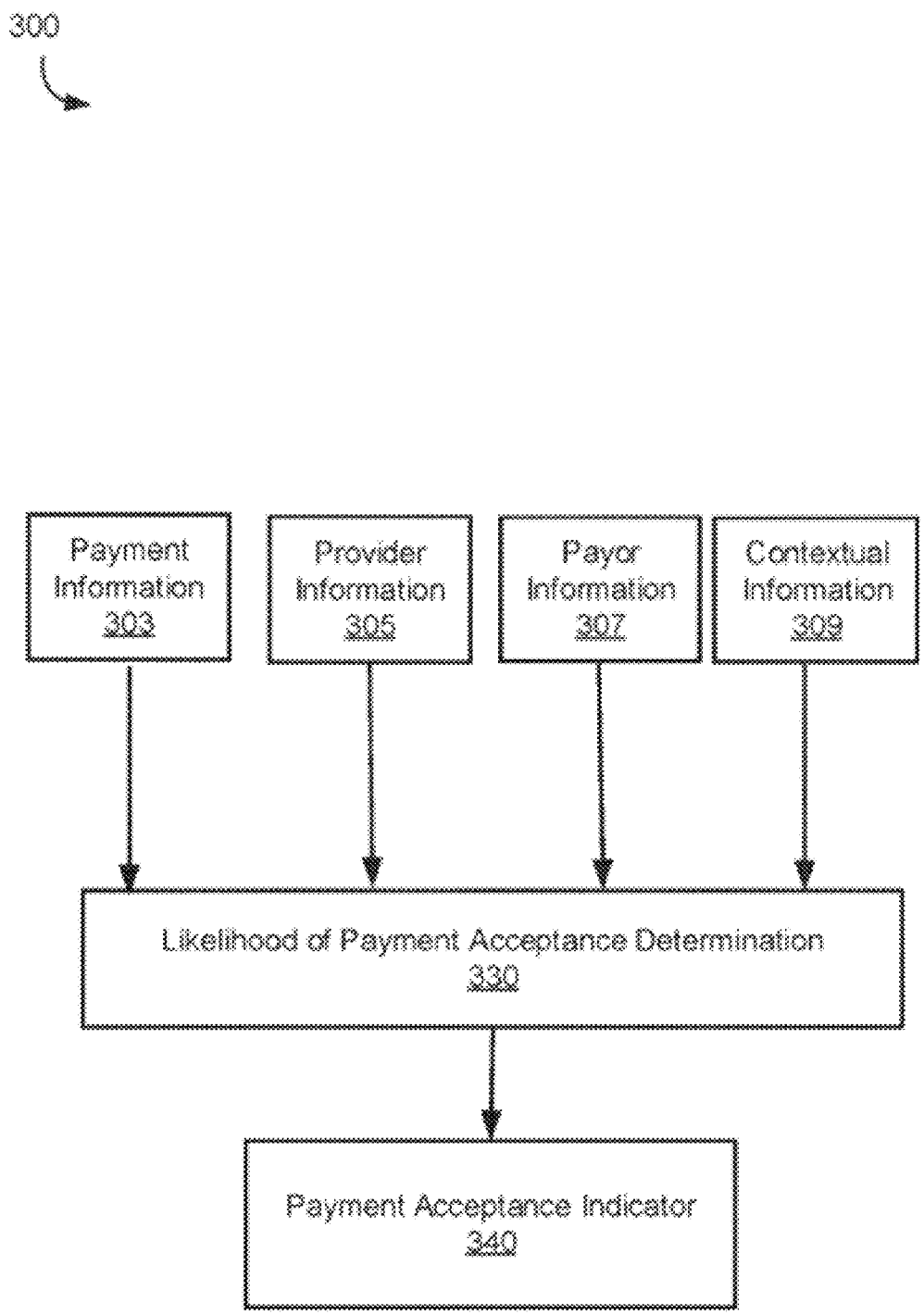
FIG. 3 illustrates an example schematic of provider-specific likelihood of payment acceptance determination analysis, according to an implementation of the disclosure.

In some embodiments, the memory of likelihood determination server 120 may store application(s) that can include executable instructions that, when executed by likelihood determination server 120, cause likelihood determination server 120 to perform actions or other operations as described and illustrated below with reference to FIGS. 2-3. For example, likelihood determination server 120 may include a likelihood of acceptance tool 126 configured to determine a payment that, when transmitted from a payor to a provider during a settlement negotiation process, is likely to be accepted by the provider. In some embodiments, likelihood of acceptance tool 126 may utilize data stored in likelihood of acceptance database 134, payment database 152, and/or external resources database 146, as will be described in detail below.

In some embodiments, system 100 may employ one or more machine learning models 128, which may execute on likelihood determination server 120.

In some embodiments, payment database 152 may include one or more databases, which may store data related to transmissions between the payor and the provider during a settlement negotiation process (e.g., payment amounts determined to be likely accepted, confirmation of payment amount offered by payor to provider, confirmation of payment amount accepted by provider, and such similar data).

In some embodiments, the memory of payment server 150 may store application(s) that can include executable instructions that, when executed by payment server 150, cause payment server 150 to perform actions or other operations as described and illustrated below with reference to FIG. 2, 4-7. For example, payment server 150 may include a payment tool 156. For example, payment tool 156 may be configured to assist payor 160 with completing a transaction to provider 165 via graphical user interface.

In some embodiments, likelihood of acceptance tool 126 and determination tool 156, may be each implemented as one or more software packages executing on one or more likelihood determination server 120 and payment server 150 computers, respectively. For example, a client application implemented on one or more payor computing device 104, provider device 105 as client mapping tool application and determination application.

In some embodiments, likelihood of payment acceptance tool 126 and determination tool 156 may each be a server application, a server module of a client-server application, or a distributed application. In some embodiments, likelihood of payment acceptance tool 126 and determination tool 156 may each be implemented using a combination of hardware and software. The application(s) can be implemented as modules, engines, or components of other application(s). Further, the application(s) can be implemented as operating system extensions, module, plugins, or the like.

Even further, the application(s) may be operative locally on the device or in a cloud-based computing environment. The application(s) can be executed within or as virtual machine(s) or virtual server(s) that may be managed in a cloud-based computing environment. Also, the application (s), and even the mapping or analysis computing devices themselves, may be located in virtual server(s) running in a cloud-based computing environment rather than being tied to one or more specific physical network computing devices. Also, the application(s) may be running in one or more virtual machines (VMs) executing on the mapping and analysis computing devices.

In some embodiments, likelihood determination server 120 and payment server 150 may transmit and receive information to and from payor computing device 104, provider device 105, one or more external resources servers 140, and/or other servers via network 103. For example, a communication interface of the likelihood determination server 120 and payment server 150 may be configured to operatively couple and communicate between likelihood of acceptance database 134, payment database 152, payor computing device 104, provider device 105, and external resources servers 140, which are all coupled together by the communication network(s) 103.

In some embodiments, likelihood of payment acceptance tool 126 and payment tool 156 may each access acceptance database 134, payment database 152, and external resources database 146 over a network 130 such as the Internet, via direct links, and the like.

In some embodiments, likelihood determination server 120 and payment server 150 may each be a standalone device or integrated with one or more other devices or apparatuses, such as one or more of the storage devices, for example. For example, likelihood determination server 120 and payment server 150 may each include or be hosted by one of the storage devices, and other arrangements are also possible.

External Resources Server

In some embodiments, external resources servers 140 may be configured to store resource data that includes data related to provider (e.g., provider information, historical provider payment acceptance information) and information related to current financial data and other such information related to events that may affect provider's decision (e.g., contextual information). In some embodiments, external resources servers 140 may be configured to communicate with additional disparate third-party services (e.g., medical, financial, regulatory, and such similar services) to request and receive data that may be used when determining likelihood of payment acceptance.

In some embodiments, external resources server(s) 140 may include any type of computing device that can be used to interface with likelihood determination server 120 and/or likelihood of acceptance tool 126, likelihood of acceptance databases 134, payment database 152, other external resources server(s) 140, and client computing devices 104, 105. For example, external resources servers 140 may include a processor, a memory, and a communication interface, which are coupled together by a bus or other communication link, although other numbers and/or types of network devices could be used. In some embodiments, external resources servers 140 may also include a database (e.g., external resource database 146).

System Architecture

In some embodiments, likelihood determination server 120, payment server 150, external resources servers 140, and or other components may be a single device. Alternatively, a plurality of devices may be used. For example, the plurality of devices associated with external resources servers 140 may be distributed across one or more distinct network computing devices that together comprise one or more external resources servers 140.

In some embodiments, likelihood determination server 120, payment server 150, external resources servers 140 may not be limited to a particular configuration. Thus, in some embodiments, likelihood determination server 120, payment server 150, external resources servers 140 may contain a plurality of network devices that operate using a master/slave approach, whereby one of the network devices operate to manage and/or otherwise coordinate operations of the other network devices. Additionally, in some embodiments, likelihood determination server 120, payment server 150, external resources servers 140 may comprise different types of data at different locations.

In some embodiments, likelihood determination server 120, external resources servers 140, payment server 150 may operate as a plurality of network devices within a cluster architecture, a peer-to-peer architecture, virtual machines, or within a cloud architecture, for example. Thus, the technology disclosed herein is not to be construed as being limited to a single environment and other configurations and architectures are also envisaged.

Although the exemplary system 100 with payor computing device 104, provider device 105, likelihood determination server 120, payment server 150, external resources servers 140, and network(s) 103 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as payor computing device 104, provider device 105, likelihood determination server 120, payment server 150, external resources servers 140 may be configured to operate as virtual instances on the same physical machine. In other words, one or more of payor computing device 104, provider device 105, likelihood determination server 120, payment server 150, external resources servers 140 may operate on the same physical device rather than as separate devices communicating through communication network(s). Additionally, there may be more or fewer devices than payor computing device 104, provider device 105, likelihood determination server 120, payment server 150, and external resources servers 140.

In addition, two or more computing systems or devices can be substituted for any one of the systems or devices, in any example set forth herein. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including, by way of example, wireless networks, cellular networks, PDNs, the Internet, intranets, and combinations thereof.

As alluded to earlier, payment negotiations over an outstanding bill for services may take place between a provider and a payor. For example, a provider may treat a claimant injured in a Workers' Compensation accident. The provider then bills a payor (i.e., the party bearing financial responsibility for the claimant) and awaits payment. Conventionally, a negotiator may reach out on behalf of the payor to the provider to determine if a more optimal agreement can be made to settle the bill and determine future payments. The process typically targets those providers that are not in a PPO at the time of that billing.

By virtue of automatically determining a payment of likelihood of payment acceptance, allows the system to generate a payment amount that is likely to be accepted by the provider. For example, FIG. 2 illustrates a process 200 for determining a likelihood of payment acceptance according to some embodiments of the disclosed technology.

Method

The process 200 may begin with obtaining a request to make a payment to one of the plurality of provider computing devices (e.g., provider device 105), from one of the plurality of payor computing devices (e.g., payor device 104) in step 205. For example, the request may include payment request information. In some embodiments, the payment request information may include provider information, payor information, and payment information. Provider information may include information specifying provider name, provider email address, provider contact number, provider services rendered, date of services rendered, invoice amount, date of invoice, and so on). Payor information may include information specifying payor name, payor email address, payor contact number, and so on. The payment information may include an invoice amount generated by the provider for services performed in the past, and an acceptable payment information that is acceptable to the user of payor computing device (e.g., payor 160, as illustrated in FIG. 1) for services performed in the past by the user of the identified provider computing device (e.g., provider 150, as illustrated in FIG. 1). For example, the services performed by the provider may include medical services, or any services rendered by the provider.

In step 210, in response to the request, a secure connection with the payor computing device may be established.

In step 215, upon establishing the secure connection with the payor computing device, a one or more of provider computing devices to which the payor computing device intends to make a payment, may be identified based on the provider information received in the request. For example, the provider computing device associated with the provider name, email address, or contact number specified in the provider information may be identified.

In step 220, in response to identifying the provider computing device, a secure connection with the provider computing device may be established.

In step 225, a determination of a likelihood of payment acceptance may be made, which may reflect the likelihood that the provider will accept a payment to settle the invoice amount. The likelihood of payment acceptance may be determined based on payment request information.

Likelihood of Payment Determination

For example, likelihood of acceptance tool 126, illustrated in FIG. 1, may determine likelihood of payment acceptance 330 for a specific provider for an unpaid invoice by analyzing information related to the provider and the payor. For example, as illustrated in FIG. 3, likelihood of payment acceptance 330 may be determined by analyzing payment information 303, provider information 305 associated with the provider indicated in the provider request, including provider historical information obtained by system 100, payor information 307 associated with the payor indicated in the provider request, and contextual information 309, which may affect the provider 105 obtained by system 100.

Payment information 303 may include an invoice amount generated by the provider for services performed in the past. In addition to the invoice amount, payment information 303 may include amount acceptable to the payor (i.e., highest amount the payor is willing to pay the provider for their services). Alternatively, the acceptable amount may include a threshold, i.e., an amount, which the payor wishes not to exceed when paying the provider. As described in detail further, the acceptable amount may be used during the negotiations to lower the invoice amount upon provider agreement. In the event provider does not agree to the lowered payment, the payor is obligated to pay the invoice amount or the amount mandated by the state based on available fee schedules, usual and customary rates, billed charges, or other prevailing rate(s). Further, payment information 303 may include a payment range, day of the month for making the payment, a number of days within which a payment has to be made, and other such information.

Provider information 307 specified by the payment request may include the type of the provider, the size of the provider (e.g., annual revenue and/or number of customers serviced), type of the service completed by provider, provider historical information, and other such information. Provider historical information may be obtained by system 100 from provider computing device 105 and/or external resource services 140, as illustrated in FIG. 1, and may include information related to payments that have been previously accepted or declined by the provider during payment negotiations with the provider.

Payor information 307 specified by the payment request may include information related to type of the payor, past transactions (i.e., account history) between the payor and the provider. For example, the past transaction information may include a number of unpaid invoices, a total amount associated with all unpaid invoices, a number of invoices paid late, a number of days past the payment due date, and other such information.

Contextual information 309 may include information related to other provider, which share provider characteristics, and their historical payment acceptance (or rejection) data. Additionally, contextual information 309 may include information related to a general financial climate at a time which may affect the provider's decision whether to accept or decline the payment. For example, contextual information 309 may include financial, banking, and market data and statistics, and other information obtained from various sources. For example, an increase in interest rates, increase in default payments, bankruptcy rates, and so on. Further, contextual information 309 may include additional details related to the industry type, payor type, and/or other specific information characterizing financial information.

Contextual information 309 may be obtained from a variety of sources including public records, financial data service providers, banking service providers, lending services providers, medical industry market analysis data providers, social media, and other sources of financial information. For example, additional information may be obtained from one or more of a financial data vendors, e.g., Moody's Analytics, Bloomberg L. P., Thomson Reuters, and other such sources.

In some embodiments, system 100 may prioritize or rate the obtained provider information 305 and contextual information 309 based on a number of additional parameters. For example, an increase in bankruptcies in the same provider type servicing less than a 100 customers may be more relevant to a provider servicing a 150 customers than a provider servicing 1000 customers.

System 100 may perform likelihood of incident determination 320 by utilizing a variety of analytical techniques to analyze collected sets of payment information, provider information, payor information, and contextual information, obtained from various sources to generate payment acceptance indicator 340. For example, system 100 may utilize Bayesian-type statistical analysis to determine the payment acceptance indicator 340. Payment acceptance indicator 340 may be a quantified likelihood of acceptance of a payment amount. That is, a calculated numerical value associated with payment acceptance indicator reflects a likelihood of the payor accepting the payment amount specified by the payor in satisfaction of the invoice amount. For example, a lower payment acceptance indicator may indicate that provider may not likely accept the payment amount specified by the payor in satisfaction of the invoice amount.

In some implementations, payment acceptance indicator 340 may be expressed based on a sliding scale of percentage values (e.g., 10%, 15%, . . . n, where a percentage reflects a likelihood of payment acceptance), as a numerical value (e.g., 1, 2, . . . n, where the magnitude of quantity reflects a likelihood of payment acceptance), or as text (e.g., "very low", "low", "medium", "high", "very high"), and other similar schemes used to represent likelihood indicator 322.

In some implementations, payment information 303, provider information 305, including provider historical information, payor information 307, and contextual information 309 may be analyzed during likelihood of payment acceptance determination 330 in conjunction with one or more predictive models. The predictive models, may include one or more of neural networks, Bayesian networks (e.g., Hidden Markov models), expert systems, decision trees, collections of decision trees, support vector machines, or other systems known in the art for addressing problems with large numbers of variables. Specific information analyzed during the likelihood of payment acceptance determination may vary depending on the desired functionality of the particular predictive model.

In some embodiments, a dynamic weight may be assigned to each payment information 303, provider information 305, including provider historical information, payor information 307, and contextual information 309 when determining the likelihood of acceptance 330.

In some implementations, specificity, relevance, confidence and/or weight may be assigned to at least one of payment information 303, provider information 305, including provider historical information, payor information 307, and contextual information 309, based on the relevance and relationship between various data points. The assignment of these weight factors may be used in determination of user-specific likelihood of payment acceptance results.

In some embodiments, the payor may identify one or more thresholds associated with the payment amount specified by the payment request and to determining the likelihood of payment acceptance. That is, the payor may specify that only determinations of likelihood of payment acceptance over a certain level of likelihood would trigger generating a payment amount in step 230 illustrated in FIG. 2, as further discussed herein.

Referring back to FIG. 3, payment acceptance indicator 340 determined during the likelihood of payment acceptance determination 320 may be compared to a threshold specified by the payor. If payment acceptance indicator 340 is above the threshold value, then the payment amount specified in the payment request in step 205 is used to go generate the payment amount.

Figure 4:
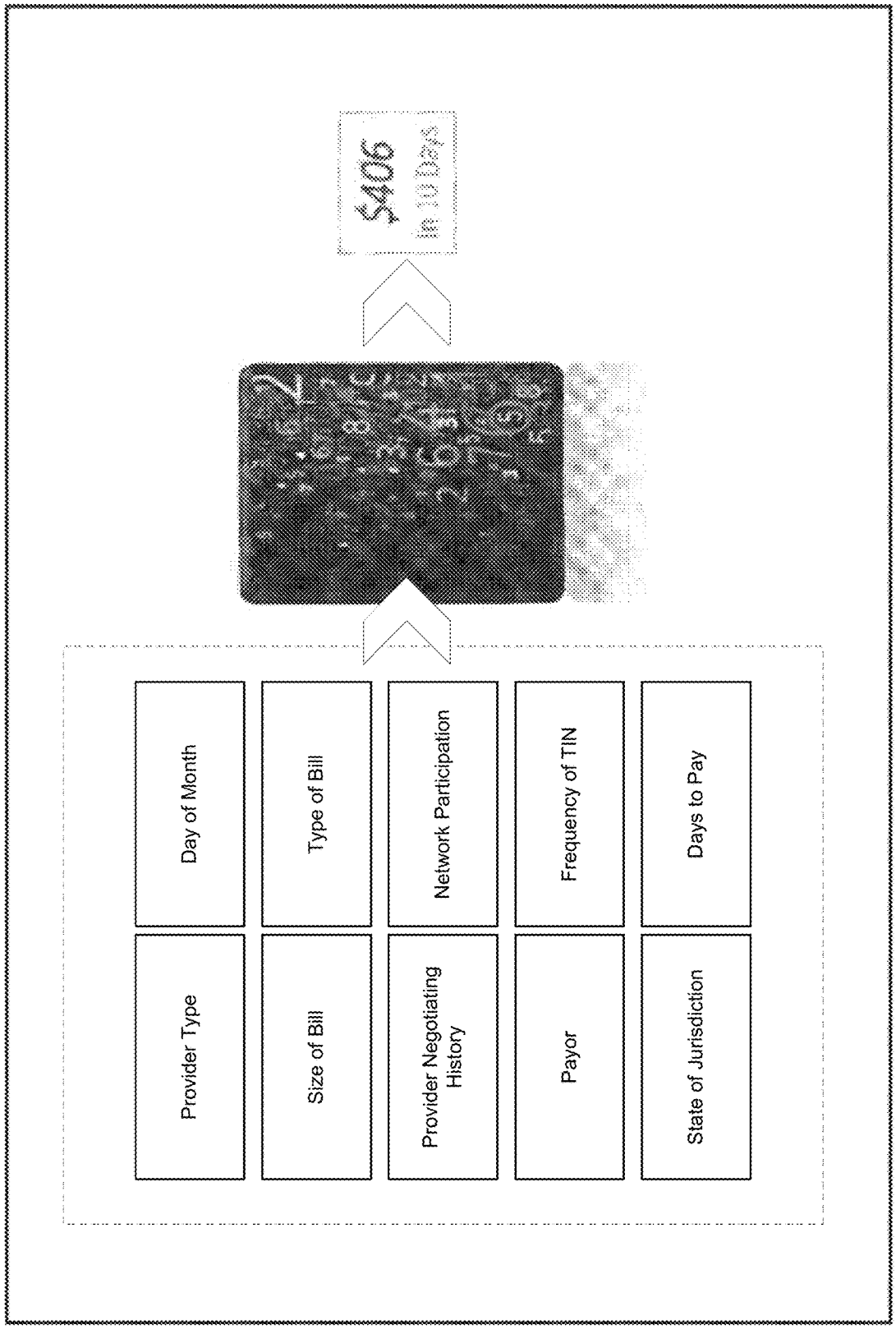

In some embodiments, the payor may identify one or more thresholds associated with the payment amount specified by the payment request and to determining the likelihood of payment acceptance. For example, as illustrated in FIG. 4, individual thresholds based on provider type, day of month, size of bill, type of bill, provider negotiating history, network participating, payor, frequency of TIN (e.g., an algorithm/formula determining how often a particular provider bills), state of jurisdiction (SOJ), and days to pay may be provided by the payor. Certain providers may have a propensity to accept a more discounted payment if the funds can be received by the provider more quickly.

Referring back to FIG. 3, the number of days within which the payment is required to be made (as provided by payment information 303) may be evaluated vis-à-vis specific negotiation practices of the provider. That is, a provider may be interest in receiving payment sooner than what is scheduled by a typical payment cycle. For example, if the number of days within which the payment is required to be made is less than three days and if the provider has a history of being involved in negotiation that has resulted in an amount paid that is higher than the amount that is initially offered, then the exact payment amount generated could be a higher amount in the provided range. However, if the number of days within which the payment is required to be made is more than a month and the provider has a history of accepting the first provided offer based on a past recorded negotiation history, then the amount that is closer to the lower end of the provided range may be generated.

In another example, type of service rendered by provider along with the payment practice associated with the type of service rendered could be considered while identifying an exact amount from the provided payment range.

Referring back to FIG. 2, as alluded to above, in step 230, the likelihood of payment acceptance may be used to generate a payment amount that is likely to be accepted by the provider of the identified provider computing device.

In step 235, the payment amount generated in step 230 may be transmitted to the payor computing device.

In step 240, a determination whether that the payor associated with the payor computing device agrees to pay the generated amount to the identified provider associated with the provider computing device may be made. For example, upon transmitting the generated amount to the payor computing device, a notification indicating that the generated payment is acceptable may be received from the payor computing device. Alternatively, upon receiving a notification indicating that the generated payment is not acceptable, a determination that an agreement has not been reached with the payor of associated with the payor computing device may be made. Accordingly, the "No" branch is taken back to step 230, where a new payment amount may be generated. In some embodiments, the previously determined likelihood of payment acceptance may be used to determine the new payment. For example, if the payment amount was generated based on a likelihood indicating acceptance rate of 60 percent, the new payment amount may be generated based on a likelihood indicating acceptance rate of 70 percent However, upon receiving a notification indicating a that the generated payment is acceptable, a determination that an agreement has been reached with the payor may be made and the "Yes" branch is taken back to step 245. In another example, the provider may be enrolled in an automated payment system. For example, provider may choose to receive all future payments by this payment modality and more specifically, may choose enroll in a standing agreement, i.e., a PPO network agreement whereby any subsequent billing that comes through our system for that provider would be paid according to the standing contract.

Figure 5:
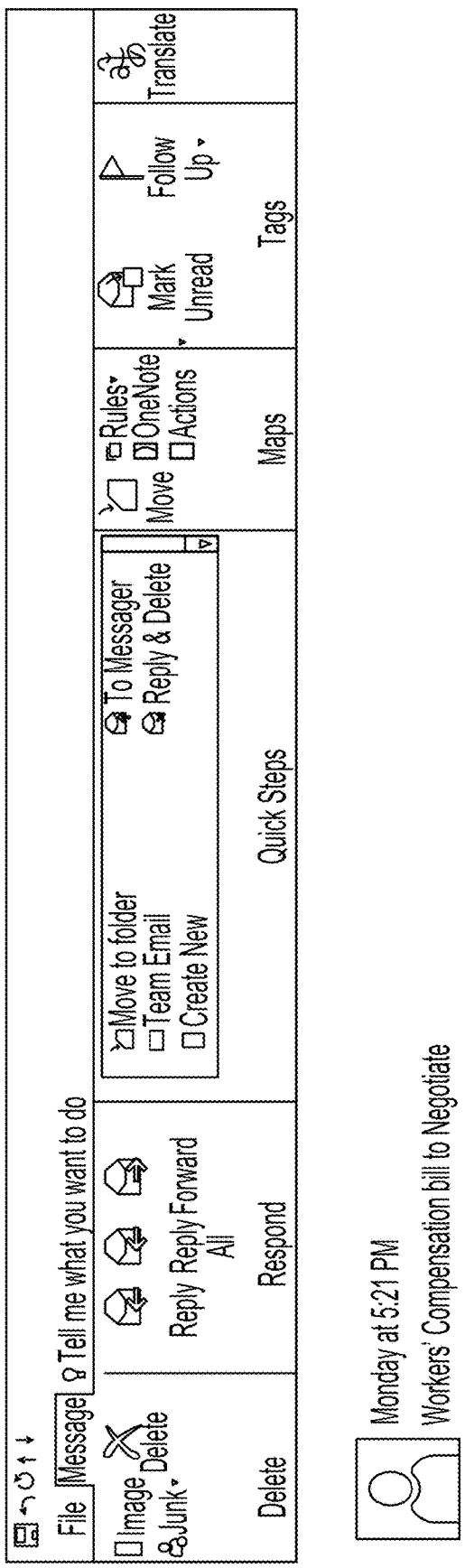

In step 245, a notification indicating that a payment is available to be received may be transmitted to the provider computing device. For example, a notification that may be sent to the provider computing device is illustrated in FIG. 5.

Referring back to FIG. 3, in step 250, a request to view the payment from the identified provider computing device may be received.

In step 255, an electronic financial transaction providing the generated amount that has been agreed to be paid by the payor via a graphic user interface may be completed. In addition to the generated amount, an electronic communication with information associated with the generated amount to the provider may be provided. For example, an electronic communication including a description of the generated amount provided to the identified provider computing device may be presented via an graphical user interface, as illustrated in FIG. 6.

Referring back to FIG. 2, in step 260, a determination whether the provided amount is accepted by the provider associated with identified provider computing device may be made. For example, the provider may select a reject icon provided along with the generated amount as illustrated in FIG. 7. Based on this selection, a determination that the generated payment is not acceptable to the provider may be made. Accordingly, the "No" branch is taken back to step 230, where a new payment amount may be generated, as described earlier.

In step 260, when the provider selects an acceptance icon provided along with the generated amount, as illustrated in FIG. 6, or some other indication of electronic acceptance, a determination that the generated payment is acceptable to the provider and the "Yes" branch is taken to step 265.

In step 265, a confirmation notification requesting the identified one provider computing device to execute a signature accepting the generated amount via the interface may be transmitted. For example, FIG. 7 illustrates a confirmation notification 703 transmitted to the provider computing device which allows provider to enter a signature via a signature field 705 provided by the graphic user interface 701.

In step 270, the signature on the confirmation notification from the provider may be received (e.g., entered by the provider via the interface).

In step 275, the received confirmation notification with the signature may be transmitted to the payor.

In step 280, an electronic payment or other payment of the generated amount which was accepted by the provider from the payor may be received (e.g., viewed via a graphical user interface). In some embodiments, the interface may include functionality whereby the provider can opt in and out of different payment modalities, view their historically executed agreements, and check on the status of a particular payment.

In step 285, the payment to the provider may be transmitted (e.g., viewed via the interface).

In step 290, method 200 may end after terminating the connection with the provider computing device and the payor computing device.

Figure 8:
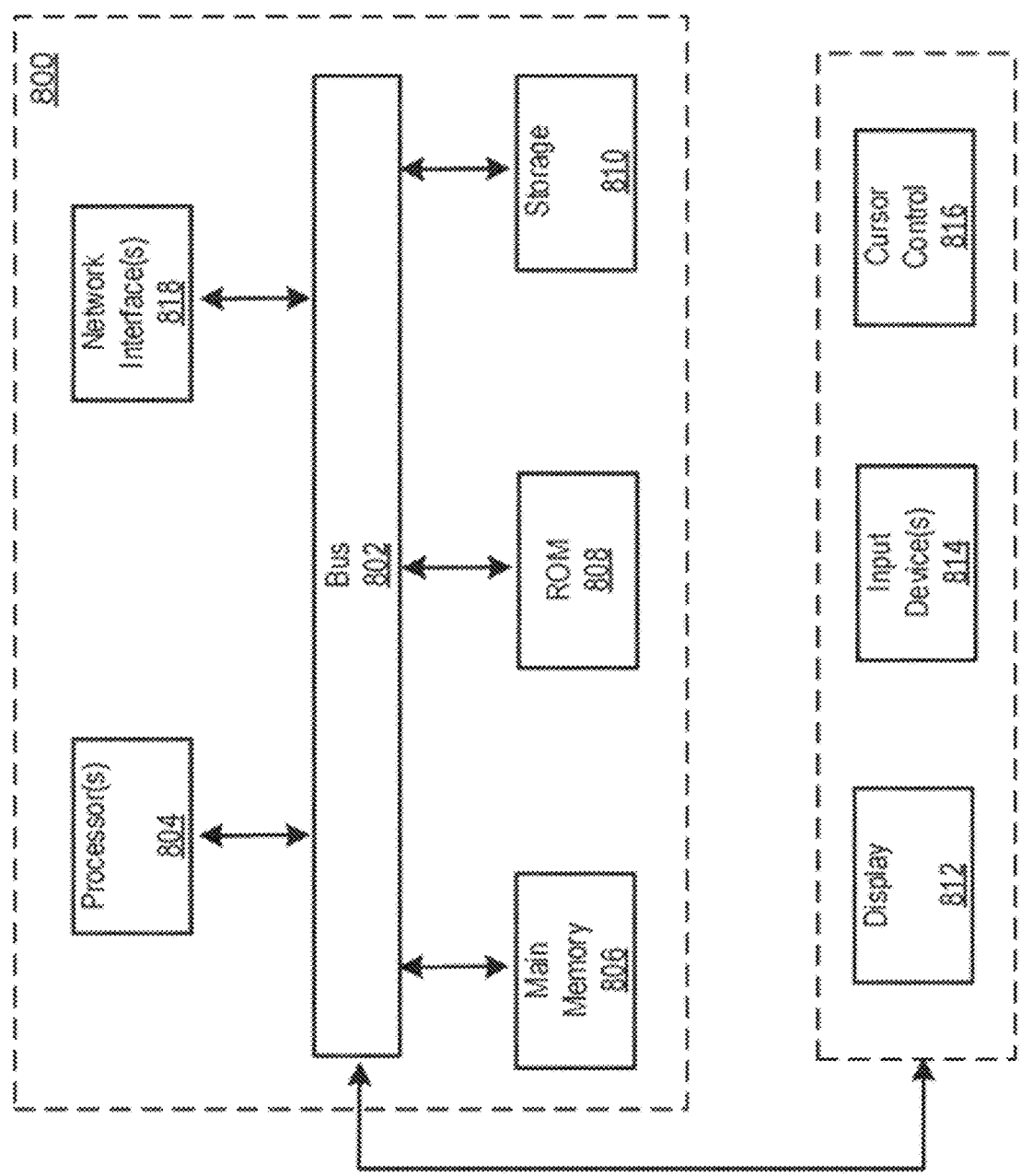
FIG. 8 illustrates an example computing system that may be used in implementing various features of embodiments of the disclosed technology.

Computer System

Where circuits are implemented in whole or in part using software, in one embodiment, these software elements can be implemented to operate with a computing or processing system capable of carrying out the functionality described with respect thereto. One such example computing system is shown in FIG. 8. Various embodiments are described in terms of this example-computing system 800. After reading this description, it will become apparent to a person skilled in the relevant art how to implement the technology using other computing systems or architectures.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors and/or specialized graphical processors.

The computer system 800 also includes a main memory 805, such as a random access memory (RAM), cache and/or other dynamic storage devices, coupled to bus 802 for storing information and instructions to be executed by processor 804. Main memory 805 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such a SSD, magnetic disk, optical disk, or USB thumb drive (Flash drive), etc., is provided and coupled to bus 802 for storing information and instructions.

The computer system 800 may be coupled via bus 802 to a display 812, such as a transparent heads-up display (HUD) or an optical head-mounted display (OHMD), for displaying information to a computer user. An input device 814, including a microphone, is coupled to bus 802 for communicating information and command selections to processor 804. An output device 816, including a speaker, is coupled to bus 802 for communicating instructions and messages to processor 804.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, boy Java, Java, C or C++. A software component may be compiled and linked into an executable program, installed in a dynamic link library, or may be written in an interpreted programming language such as, for example, BASIC, Perl, or Python. Components may also be written in a database language such as SQL and/or handled via a database object such as a trigger or a constraint. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 805. Such instructions may be read into main memory 805 from another storage medium, such as storage device 810. Execution of the sequences of instructions contained in main memory 805 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 805. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A method comprising:
receiving, by a transaction management computing apparatus, an electronic payment estimate via a secure communication channel for services rendered by a provider associated with a provider computing device, wherein the payment estimate is specified by an invoice generated by the provider computing device;

determining, by the transaction management computing apparatus, a likelihood of payment acceptance by the provider for a payment amount acceptable to the provider by applying a machine learning algorithm, wherein the machine learning algorithm is trained on historical contextual information for the provider;

determining that the likelihood of payment acceptance exceeds a threshold, and generating, by the transaction management computing apparatus, an exact amount acceptable to the provider computing device comprising the payment amount acceptable to the provider;

determining, by the transaction management computing apparatus, whether the generated exact amount is acceptable to the provider computing device; and completing, by the transaction management computing apparatus, a payment transaction with the generated exact amount when the generated exact amount is determined to be acceptable to the provider computing device.

2. The method as set forth in claim 1 wherein the historical payment acceptance data for the provider comprises negotiation data associated with the provider computing device.

3. The method as set forth in claim 1 wherein the payment amount acceptable to the provider computing device comprises applying a likelihood of acceptance tool to a type of pending invoice.

4. The method as set forth in claim 1 further comprising, generating a new exact amount for the provider computing device when the generated exact amount is unacceptable to the provider computing device.

5. A non-transitory computer readable medium having stored thereon instructions for completing a transaction comprising executable code, which when executed by at least one processor, cause the processor to:

receive a payment estimate for a provider computing device via a secure communication channel for services rendered by a provider associated with a provider computing device, wherein the payment estimate is specified by an invoice generated by the provider computing device;

determining a likelihood of payment acceptance by the provider for a payment amount acceptable to the provider by applying a machine learning algorithm, wherein the machine learning algorithm is trained on historical contextual information for the provider;

determining that the likelihood of payment acceptance exceeds a threshold, and generate an exact amount acceptable to the provider computing device comprising the payment amount acceptable to the provider;

determine when the generated exact amount is acceptable to the provider computing device; and complete a payment transaction with the exact amount when the generated exact amount is determined to be acceptable to the provider computing device.

6. The medium as set forth in claim 5 wherein the historical payment acceptance data for the provider comprises negotiation data associated with the provider computing device.

7. The medium as set forth in claim 5 wherein the payment amount acceptable to the provider computing device comprises applying a likelihood of acceptance tool to a type of pending invoice.

8. The medium as set forth in claim 5 further comprising, generating a new exact amount for the provider computing device when the generated exact amount is unacceptable to the provider computing device.

9. A transaction management computing apparatus comprising:

a processor; and a memory coupled to the processor which is configured to be capable of executing programmed instructions comprising and stored in the memory to:

receive a payment estimate for a provider computing device via a secure communication channel for services rendered by a provider associated with a provider computing device, wherein the payment estimate is specified by an invoice generated by the provider computing device;

determine a likelihood of payment acceptance by the provider for a payment amount acceptable to the provider by applying a machine learning algorithm, wherein the machine learning algorithm is trained on historical contextual information for the provider;

determining that the likelihood of payment acceptance exceeds a threshold, and generate an exact amount acceptable to the provider computing device comprising the determined payment amount acceptable to the provider;

determine when the generated exact amount is acceptable to the provider computing device; and complete a payment transaction with the generated exact amount when the generated exact amount is determined to be acceptable to the provider computing device.

10. The apparatus as set forth in claim 9 wherein the historical payment acceptance data for the provider comprises negotiation data associated with the provider computing device.

11. The apparatus as set forth in claim 9 wherein the payment amount acceptable to the provider computing device comprises applying a likelihood of acceptance tool to a type of pending invoice.

12. The apparatus as set forth in claim 11 wherein the processor is further configured to be capable of executing the stored programmed instructions to generate a new exact amount for the provider computing device when the generated exact amount is unacceptable to the provider computing device.

* * * * *